United States Patent
Wei

[19]

[11] Patent Number: 6,061,893

[45] Date of Patent: May 16, 2000

[54] METHOD FOR MANUFACTURING THE V-SHAPED LEGS OF A CHAIR

[76] Inventor: Long-Yi Wei, No. 26-1, Yung-Shin, Lu-Chang Li, Hsi-Lo Chen, Yunlin Hsien, Taiwan

[21] Appl. No.: 09/276,363

[22] Filed: Mar. 25, 1999

[51] Int. Cl.[7] ..................................................... B23P 13/04
[52] U.S. Cl. ............................................................. 29/558
[58] Field of Search .............................. 29/897.2, 34 R, 29/33 A, 558, DIG. 18; 72/377

[56] References Cited

U.S. PATENT DOCUMENTS 3,645,124  2/1972  Rohrabaugh ............................... 72/377

*Primary Examiner*—David P. Bryant
*Assistant Examiner*—Jermie E. Cozart
*Attorney, Agent, or Firm*—Kolisch Hartwell Dickinson McCormack & Heuser

[57] ABSTRACT

A method for manufacturing a leg of a chair includes step 1 for preparing a metal ingot; step 2 for bending the metal ingot to be a V-shaped member; step 3 for forging the V-shaped member to have recesses defined therein; step 4 for removing the flash from the V-shaped member; step 5 for applying a first heat treatment process; step 6 for adjusting the V-shaped member precisely and step 7 for applying a second heat treatment process to the V-shaped member in step 6.

4 Claims, 5 Drawing Sheets

METHOD FOR MANUFACTURING THE V-SHAPED LEGS OF A CHAIR

FIELD OF THE INVENTION

The present invention relates to a method for manufacturing the V-shaped legs of a chair used in aircraft. The legs are manufactured by forging from a cylindrical ingot or rod.

BACKGROUND OF THE INVENTION

A leg used for a chair in aircraft is shown in FIG. 7. The leg is generally made of Aluminum and is a V-shaped member having three first recesses (130) to reinforce the structural strength and a hole (131) defined through each end thereof to connect the leg to the seat frame (not shown). Referring to FIG. 8 which shows that a pair of legs (110) are cut from an Aluminum plate (11). The legs (110) are then machined to obtain the recesses (130) and the holes (131) as disclosed in FIG. 7. The final process is the heat treatment process to make the legs (110) have the desired stiffness. However, the conventional method involves the following shortcomings:

1. To cut the two legs (110) from an Aluminum plate (11) wastes too much material. It is estimated that only 40% of the material is utilized.
2. The crystalline structure of the Aluminum plate (11) is broken when cutting the two legs. This could weaken the structural strength of the legs.
3. The steps involve the use of a complicated skill and take a long time so that the manufacturing cost cannot be reduced.

The present invention intends to provide a method for manufacturing the legs of a chair with a simple process that saves time and money. The present invention uses a metal rod to manufacture the leg of a chair so as to reduce the wasted metal and effectively resolve the shortcomings of the conventional method for manufacturing the legs of a chair.

SUMMARY OF THE INVENTION

In accordance with one aspect of the present invention, there is provided a method for manufacturing the leg of a chair that comprises the following steps:

step 1: preparing a metal ingot;

step 2: bending the metal ingot into a V-shape;

step 3: forging the V-shaped member from step 2 to include at least one first recess in at least one side thereof and two second recesses defined in two ends thereof, with flash being formed on the periphery of the V-shaped member during the forging process;

step 4: roughly removing the flash from the V-shaped member formed in step 3;

step 5: applying a first heat treatment process (T4 process) to the V-shaped member resulting from step 4;

step 6: removing the flash left on the V-shaped member in step 5 and adjusting the V-shaped member to have the precise desired shape, and step 7: applying a second heat treatment process (T6 process) to the V-shaped member in step 6.

The main object of the present invention is to provide a method that transforms a metal ingot to a V-shaped leg for a chair used in aircraft.

Another object of the present invention is to provide a method for manufacturing a V-shaped leg of a chair, wherein a tremendous amount of material is saved when compared with the material consuming in the conventional method.

Further objects, advantages, and features of the present invention will become apparent from the following detailed description with appropriate reference to the accompanying drawings.

DETAILED DESCRIPTION OF THE PREFERRED EMBODIMENT

Figure 1:
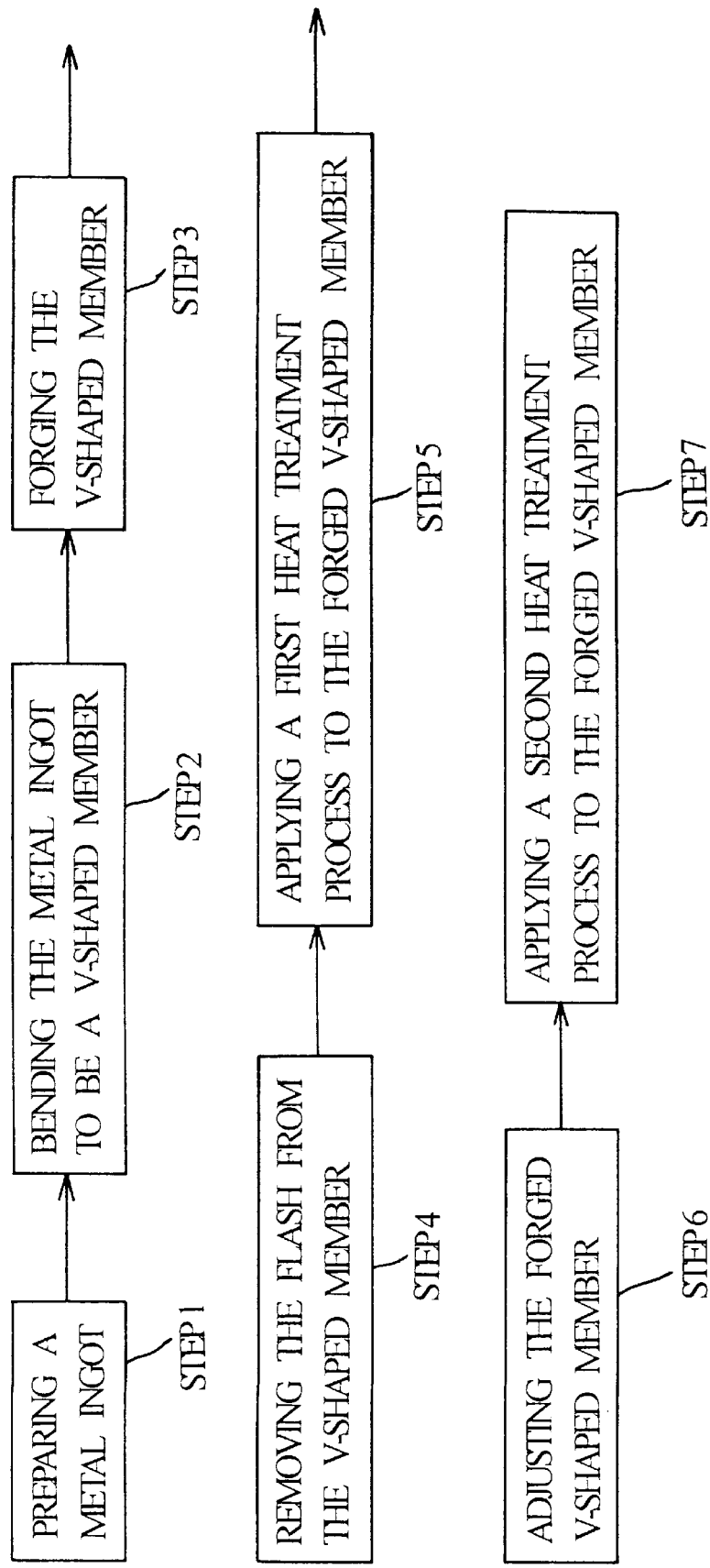
FIG. 1 is a flow chart illustrating the method in accordance with the present invention.
Figure 4:
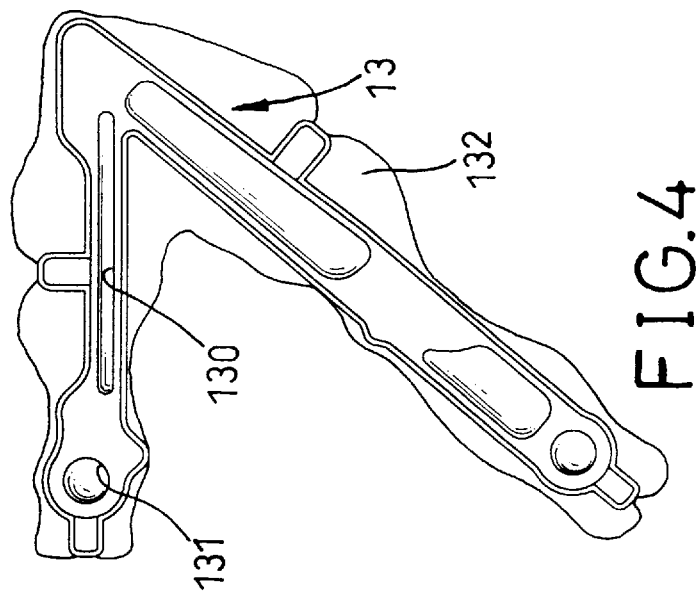
FIG. 4 is a side elevational view to show the V-shaped member forged to have recesses defined therein.
Figure 2:
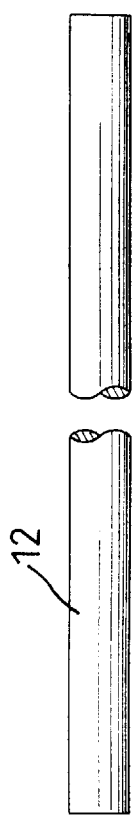
FIG. 2 shows the metal rod chosen in the step 1 of the method in accordance with the present invention.
Figure 3:
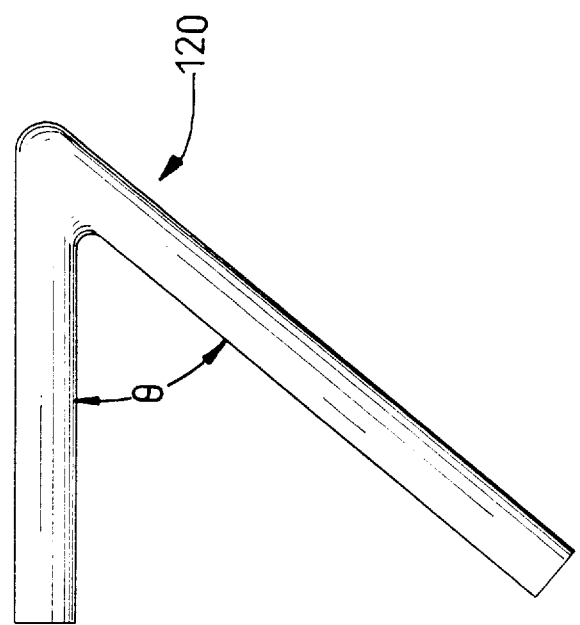
FIG. 3 shows the V-shaped member bent from the metal rod in step 2.
Figure 6:
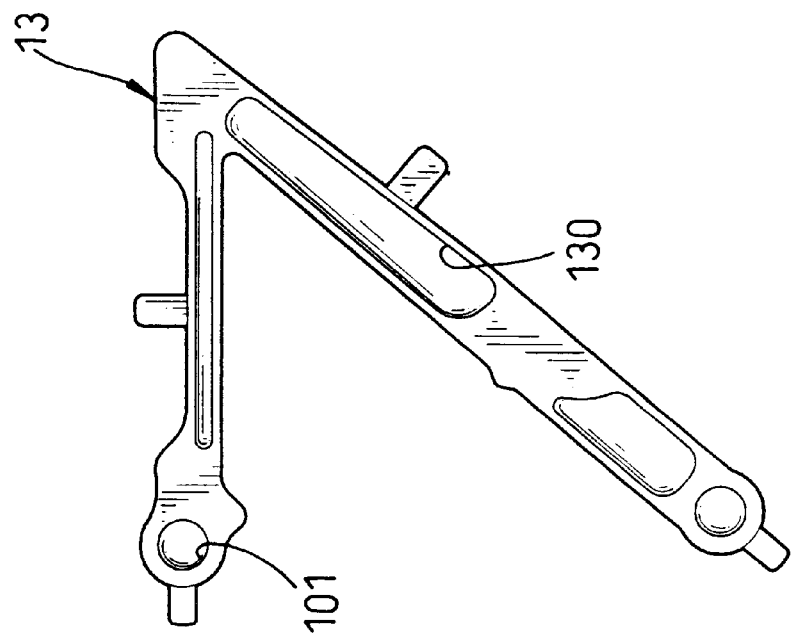
FIG. 6 shows the V-shaped member ready for a first heat treatment process.
Figure 5:
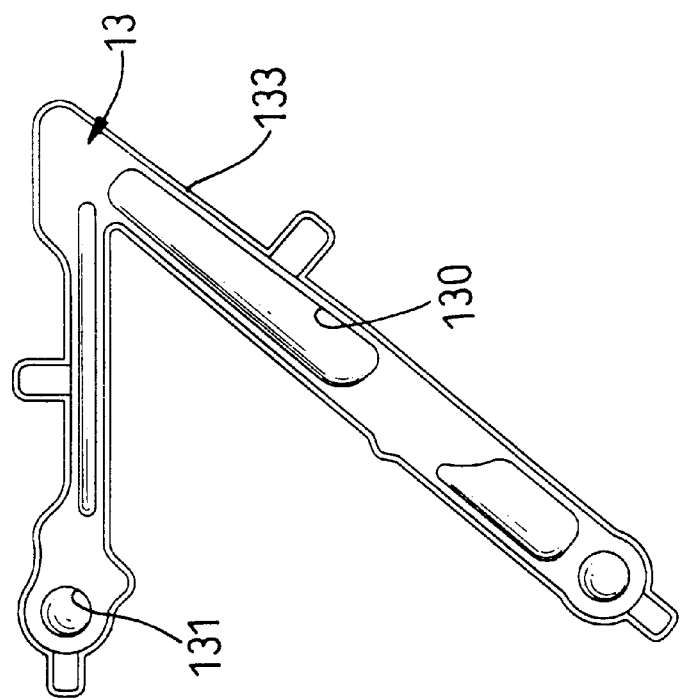
FIG. 5 shows that the flash removed from the forged V-shaped member.
Figure 7:
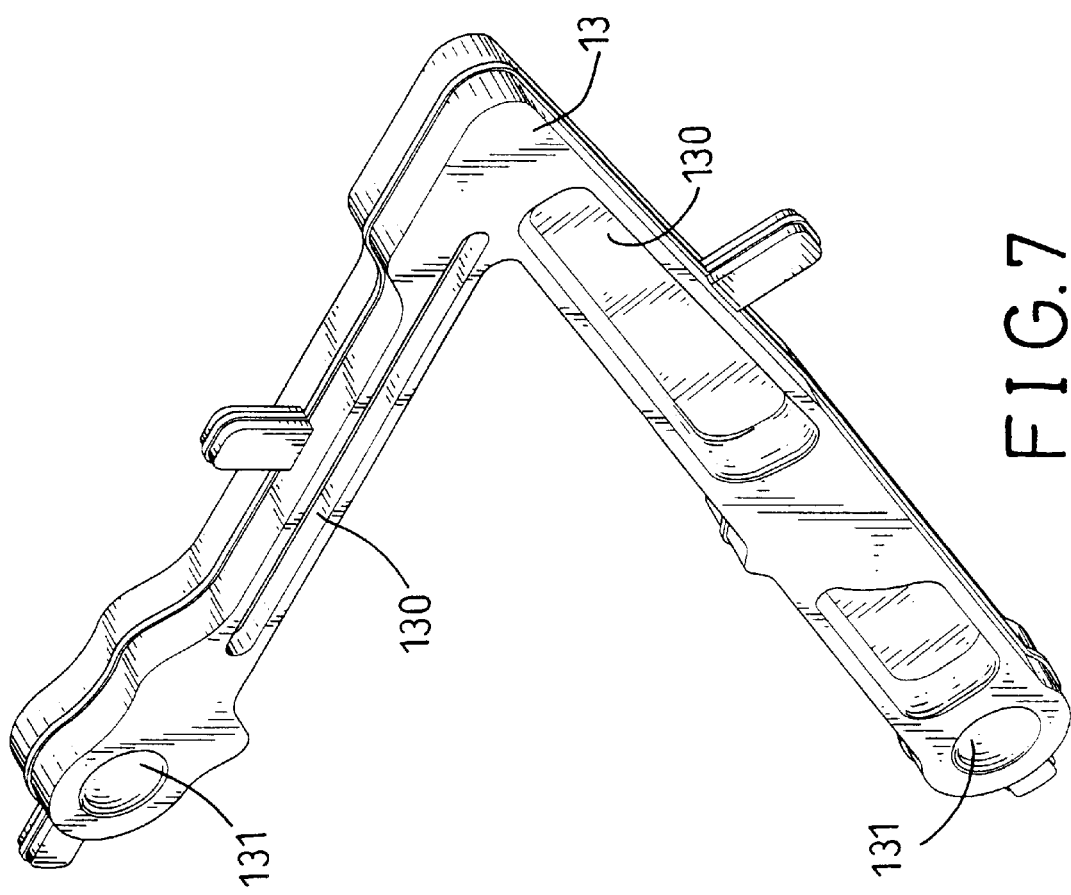
FIG. 7 is a perspective view of the V-shaped leg in accordance with the present invention.
Figure 8:
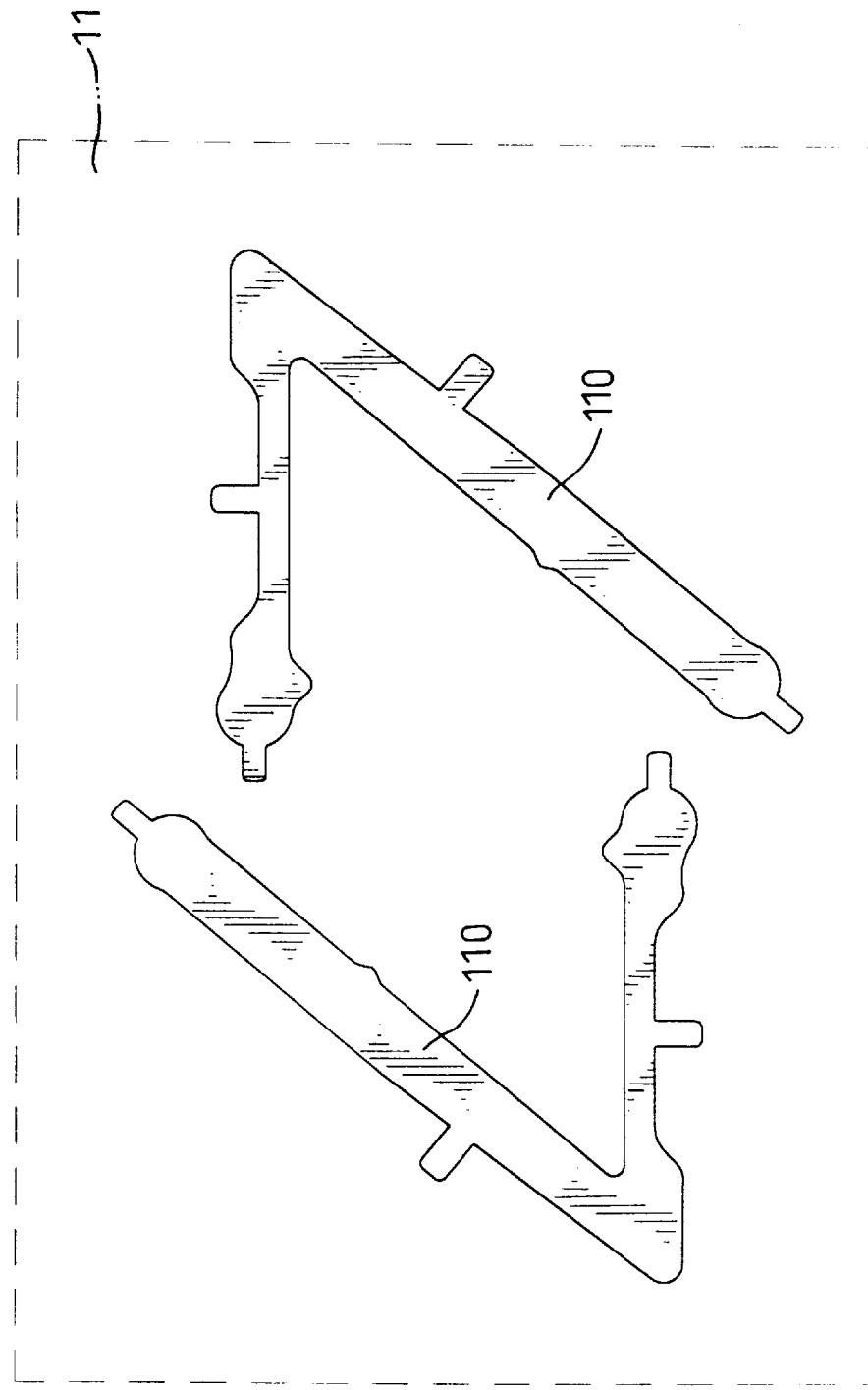
FIG. 8 is an illustrative view to show two conventional legs cut from an Aluminum plate.

Referring to FIGS. 1 to 6, the method for manufacturing a leg of a chair comprises the following eight steps which are:

step 1: To prepare a metal ingot (12) which can be an Aluminum alloy rod.

step 2: To bend the metal ingot (12) to be a V-shaped member (120) by a proper machine, wherein the angle (121) between the two sides of the V-shaped member (120) is smaller than or equal to 90 degrees.

step 3: To forge the V-shaped member (120) in step 2 to include three first recesses (130) in at least one side thereof and two second recesses (131) defined in two ends thereof. During the forging process, flash (132) is formed on the periphery of the forged V-shaped member (13).

step 4: To roughly removing the flash (132) from the forged V-shaped member (13) in step 3.

step 5: To apply a first heat treatment process (T4 process) to the forged V-shaped member (13) in step 4, and small amount of flash (133) is left on the periphery of the forged V-shaped member (13).

step 6: To Remove the small amount of flash (133) left on the forged V-shaped member (13) in step 5 and adjust the forged V-shaped member (13) to have the precise desired shape and angle.

step 7: To apply a second heat treatment process (T6 process) to the forged V-shaped member (13) in step 6.

step 8: To drill the two second recesses (131) to be two holes (101) as shown in FIG. 6.

By using the method in accordance with the present invention, each leg (13) is made from a metal ingot (12) so that the material is utilized effectively. By this method, the structural strength of the leg is not damaged or affected.

Although the invention has been explained in relation to its preferred embodiment, it is to be understood that many other possible modifications and variations can be made without departing from the spirit and scope of the invention as hereinafter claimed.

What is claimed is:

1. A method for manufacturing a leg of a chair, comprising:

step 1: preparing a metal ingot (12);

step 2: bending said metal ingot (12) to be a V-shaped member (120);

step 3: forging the V-shaped member (120) in step 2 to include at least one first recess (130) in at least one side thereof and two second recesses (131) defined in two ends thereof, with flash (132) being formed on the periphery of said forged V-shaped member (13) during the forging process;

step 4: roughly removing said flash (132) from said forged V-shaped member (13) in step 3;

step 5: applying a first heat treatment process (T4 process) to said forged V-shaped member (13) in step 4 with a small amount of flash (133) left on the periphery of said forged V-shaped member (13);

step 6: removing said flash (133) left on said forged V-shaped member (13) in step 5 and adjusting said forged V-shaped member (13) to have the precise desired shape, and step 7: applying a second heat treatment process (T6 process) to said forged V-shaped member (13) in step 6.

2. The method as claimed in claim 1 further comprising a step 8 which includes a step to drill said two second recesses (131) to be two holes (101).

3. The method as claimed in claim 1, wherein the angle (121) between the two sides of said V-shaped member (120) is smaller than 90 degrees.

4. The method as claimed in claim 1, wherein the angle (121) between the two sides of said V-shaped member (120) is equal to 90 degrees.

* * * * *